United States Patent
Meng et al.

(10) Patent No.: US 10,454,888 B2
(45) Date of Patent: Oct. 22, 2019

(54) METHOD AND DEVICE FOR PROCESSING DATA MESSAGE

(71) Applicant: ZTE Corporation, Shenzhen (CN)

(72) Inventors: Wei Meng, Shenzhen (CN); Cui Wang, Shenzhen (CN); Bo Wu, Shenzhen (CN); Liang Fan, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/121,842

(22) PCT Filed: Jul. 22, 2014

(86) PCT No.: PCT/CN2014/082768
§ 371 (c)(1),
(2) Date: Aug. 26, 2016

(87) PCT Pub. No.: WO2015/127752
PCT Pub. Date: Sep. 3, 2015

(65) Prior Publication Data
US 2017/0019373 A1 Jan. 19, 2017

(30) Foreign Application Priority Data
Feb. 26, 2014 (CN) .......................... 2014 1 0067400

(51) Int. Cl.
*H04L 29/12* (2006.01)
*H04L 12/64* (2006.01)
*H04L 12/755* (2013.01)

(52) U.S. Cl.
CPC ...... *H04L 61/6059* (2013.01); *H04L 12/6418* (2013.01); *H04L 45/021* (2013.01);
(Continued)

(58) Field of Classification Search
None
See application file for complete search history.

(56) References Cited

U.S. PATENT DOCUMENTS

| | | | |
|---|---|---|---|
| 2010/0125652 A1* | 5/2010 | Rantapuska | H04L 12/2818 709/222 |
| 2010/0202321 A1 | 8/2010 | Dec | |

FOREIGN PATENT DOCUMENTS

| | | |
|---|---|---|
| CN | 102158563 A | 8/2011 |
| CN | 102970386 A | 3/2013 |
| CN | 103731394 A | 4/2014 |

OTHER PUBLICATIONS

International Search Report for corresponding application PCT/CN2014/082768 filed on Jul. 22, 2014; dated Nov. 25, 2014.
(Continued)

*Primary Examiner* — Chi H Pham
*Assistant Examiner* — Raul Rivas
(74) *Attorney, Agent, or Firm* — Cantor Colburn LLP

(57) ABSTRACT

Provided are a method and device for processing a data message. The method may include that: an Internet Protocol version 6 (IPv6) transition strategy used for executing an IPv6 transition technology is received from a Service function chain (SFC) controller; and a received data message is processed according to the received IPv6 transition strategy. By the technical solution, the problems of incapability of a network system in effective running during fusion with an IPv6 transition technology and incapability in effective implementation of unified deployment of the IPv6 transition technology in the related technology are solved, and the effects of effectively reducing performance pressure on an existing network and greatly alleviating channel congestion between equipment and equipment are further achieved.

10 Claims, 4 Drawing Sheets

(52) U.S. Cl.
CPC ........ *H04L 61/2007* (2013.01); *H04L 61/251* (2013.01); *H04L 61/256* (2013.01)

(56) References Cited

OTHER PUBLICATIONS

Boucadair C. Jacuenet, "Service Function Chaining: Framework & Architecture: . . . ", Internet Engineering Task Force, Feb. 13, 2014, pp. 1-25, XP015096732.
Cathy Zhou, Huawei Technologies, "Output Draft new recommendations Q. Ipv6UIP Scenarios and Signaling Requirements of unified intelligent programmable interface for IPv6", International Telecommunication Union, vol. 6/11, Feb. 21, 2014, pp. 107, XP044060390.
European Search Report for corresponding application EP14884258; dated Feb. 8, 2017.
Liu C. Zhou, "Openv6 Architecture for IPv6 Deployment", Internet Engineering Task Force, Oct. 21, 2013, pp. 1-6, XP015095714.
Wenfeng Xia et al, "A software defined approach to unified IPv6 transition", Sigcomm, ACM, Aug. 27, 2013, pp. 547-548, XP058030832.

\* cited by examiner

METHOD AND DEVICE FOR PROCESSING DATA MESSAGE

TECHNICAL FIELD

The present disclosure relates to the field of communication, and in particular to a method and device for processing a data message.

BACKGROUND

Along with rapid development of modern technologies, the Internet has been widely applied to various fields. Internet Protocol version 4 (IPv4) adopted at the present stage cannot meet requirements of development of times, since defined IPv4 addresses have been completely allocated and many countries and regions are still confronted with the problem of shortage of IPv4 addresses. It is an inevitable trend to replace IPv4 with a new-generation address protocol Internet Protocol version 6 (IPv6), but transition from IPv4 to IPv6 will be a long and gradual process. In such a process, many types of IPv6 transition technologies emerge, mainly including:

an IPv6/IPv4 dual-stack technology: a dual-stack node adopts an IPv4 protocol stack when communicating with an IPv4 node, and adopts an IPv6 protocol stack when communicating with an IPv6 node;

a tunneling technology: the technology can implement communication connection between two IPv6 stations through an IPv4 network and implement communication connection between two IPv4 stations through an IPv6 network; and an IPv4/IPv6 protocol conversion technology: the technology enables mutual access between an IPv4 network and an IPv6 network.

At present, a plurality of workgroups of the Internet Engineering Task Force (IETF), the most authoritative technology standardization organization in global Internet, are discussing technologies for IPv6 transition, and a current main solution involves: technological forms such as Network Address Translation IPv4-IPv4 (NAT44), NAT IPv4-IPv4-IPv4 (NAT444), Dual-Stack Lite (DS-Lite), Light Weight 4over6, Mapping of Address and Port with Encapsulation (MAP), NAT IPv6-IPv4 (NAT64), an IPv6 Provider Edge (6PE) and IV-VI (Roman numerals 4-6, representative of IPv4-IPv6 stateless translation) (WI).

However, each IPv6 transition technology in a related technology only solves an IPv6 transition problem in a specific scenario, and cannot run in a unified manner. Moreover, efforts at unified deployment of IPv6 technologies are all made on the basis of a Software Defined Network (SDN). The SDN structure is a novel network innovation structure, and the core technology of the SDN separates a control plane and a data plane of network equipment, thereby implementing flexible control over network traffic and providing a good platform for innovation of a core network and an application.

Fusing an IPv6 transition technology and an SDN technology solves problems of unified deployment and management of IPv6, but also has many disadvantages, for example, sessions are required to be maintained in most of IPv6 transition technologies in the related technology. The so called session is a mapping entry of and intranet address and port and extranet address and port generated by access of a user to an extranet. FIG. 1 is a structure diagram of an SDN and IPv6 transition fusion technology in the related technology. As shown in FIG. 1, the SDN and IPv6 transition fusion technology has the following disadvantages.

In the SDN and IPv6 transition fusion technology provided by the related art, a first packet of a user connected to the Internet is sent to an SDN controller for the SDN controller to generate a session through forwarding equipment. Since the SDN controller is required to manage a large number of forwarding equipment, such a manner may require the SDN controller to maintain a large number of sessions and make a large part of SDN controller performance occupied. For example, the SDN controller controls 10,000 pieces of forwarding equipment, each piece of forwarding equipment maximally supports accommodation of 10 millions of sessions, and if an SDN structure is adopted, the SDN controller is required to support 100 billions of sessions, which brings enormous pressure to the SDN controller. In addition, the SDN controller is also responsible for managing other services, such as network topology calculation and flow table transmission, so that higher storage and calculation pressure may be brought after an IPv6 transition technology is fused.

Moreover, the first packet of the user connected to the Internet is sent to the SDN controller through the forwarding equipment, and high traffic can be generated between the forwarding equipment and the SDN controller to cause network congestion. For example, the forwarding equipment supports creation of 1 million sessions per second, each SDN controller controls 10,000 pieces of forwarding equipment, then 10 billions of data packets are generated by transmission between the forwarding equipment and the SDN controller per second, and it is impossible for the SDN controller to complete receiving and processing the data packets.

Therefore, there exist the problems of incapability of a network system in effective running during fusion with an IPv6 transition technology and incapability in effective implementation of unified deployment of the IPv6 transition technology in the related technology.

SUMMARY

The embodiments of the present disclosure provide a method and device for processing a data message, so as to at least solve the problems of incapability of a network system in effective running during fusion with an IPv6 transition technology and incapability in effective implementation of unified deployment of the IPv6 transition technology in the related technology.

According to an aspect of the embodiments of the present disclosure, a method for processing a data message is provided, which may include that: an IPv6 transition strategy used for executing an IPv6 transition technology is received from a Service function chain (SFC) controller; and a received data message is processed according to the received IPv6 transition strategy.

Optionally, the IPv6 transition strategy may include at least one of: an IPv6 transition technology type used for identifying a technology type for IPv6 transition, public network address pool information used for identifying NAT of the data message and a Service Function (SF) set included in an SF node.

Optionally, the IPv6 transition technology type may include at least one of: a DS-Lite technology, an IPv6 Rapid Deployment (6RD) technology, a 6PE technology, an IPv6 Virtual Private Network Provider Edge (6VPE) technology, a NAT technology, a NAT444 technology, a MAP technology, an IVI technology, a Light Weight 4over6 technology, an IPv6 over IPv4 (6o4) tunneling technology, an IPv4 over IPv6 (4o6) tunneling technology, a NAT64 technology, a Popular IPv4 over IPv6 (P4ov6) tunneling technology and a stateful and stateless mixed translation 464XLAT technology.

Optionally, the SF set included in the SF node may include at least one of: SF-NAT, SF-Soft Wire (SF-SW), SF-LOG and SF-USER.

Optionally, before the step that the data message received at an SDN is processed according to the received IPv6 transition strategy, the method may further include that: the data message classified by a service classifier is received, wherein the data message may carry at least one of the following data message information: a service type, an IPv6 transition technology type, a next hop, a forwarding path, an outbound flag, an inbound flag, a flow sequence number, a public network address pool index, a user index and an access control list index.

Optionally, the service classifier may be born in at least one of the following network equipment: a server, a virtual machine, a router, a switch, a home gateway and a firewall.

Optionally, the step that the data message received at the SDN is processed according to the received IPv6 transition strategy may include that: under a condition that the received data message is the first message, an Internet Protocol (IP) address and a port are extracted from an address pool identified by the public network address pool index; a forwarding table entry is generated according to the extracted IP address and port and a source IP address, source port number and protocol type of the data message; and the data message is forwarded according to the generated forwarding table entry.

According to another aspect of the embodiments of the present disclosure, a device for processing a data message is provided, which may include: a first receiving component, configured to receive an IPv6 transition strategy used for executing an IPv6 transition technology from an SFC controller; and a processing component, configured to process a received data message according to the received IPv6 transition strategy.

Optionally, the device may further include: a second receiving component, configured to receive the data message classified by a service classifier, wherein the data message may carry at least one of the following data message information: a service type, an IPv6 transition technology type, a next hop, a forwarding path, an outbound flag, an inbound flag, a flow sequence number, a public network address pool index, a user index and an access control list index.

Optionally, the processing component may include: an extraction unit, configured to, under a condition that the received data message is the first message, extract an IP address and a port from an address pool identified by the public network address pool index; a generation unit, configured to generate a forwarding table entry according to the extracted IP address and port and a source IP address, source port number and protocol type of the data message; and a forwarding unit, configured to forward the data message according to the generated forwarding table entry.

Optionally, the device may be born in at least one of the following network equipment: a server, a virtual machine, a router, a switch, a home gateway and a firewall.

According to the embodiments of the present disclosure, the IPv6 transition strategy used for executing the IPv6 transition technology is received from the SFC controller; and the received data message is processed according to the received IPv6 transition strategy, so that the problems of incapability of a network system in effective running during fusion with an IPv6 transition technology and incapability in effective implementation of unified deployment of the IPv6 transition technology in the related technology are solved, and the effects of effectively reducing performance pressure on an existing network and greatly alleviating channel congestion between equipment and equipment are further achieved.

BRIEF DESCRIPTION OF THE DRAWINGS

The drawings described here are adopted to provide further understanding of the present disclosure, and form a part of the present disclosure. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
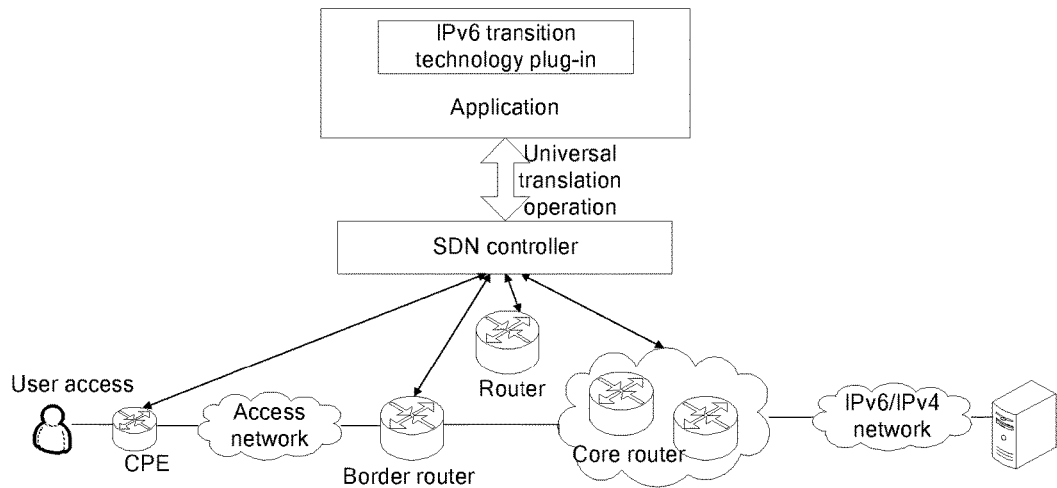
FIG. 1 is a structure diagram of an SDN and IPv6 transition fusion technology in the related technology.
Figure 2:
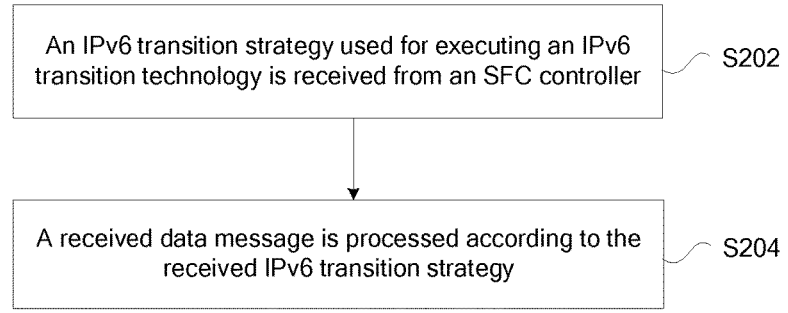
FIG. 2 is a flowchart of a method for processing a data message according to an embodiment of the present disclosure.

An embodiment provides a method for processing a data message. FIG. 2 is a flowchart of a method for processing a data message according to the embodiment of the present disclosure. As shown in FIG. 2, the flow may include the following steps:

Step S202: an IPv6 transition strategy used for executing an IPv6 transition technology is received from an SFC controller, wherein the IPv6 transition strategy may include technical processing used for executing IPv6 transition, for example, the IPv6 transition strategy may include at least one of: an IPv6 transition technology type used for identifying a technology type for IPv6 transition, public network address pool information used for identifying NAT of a data message and an SF set included in an SF node; and Step S204: a received data message is processed according to the received IPv6 transition strategy.

By the abovementioned steps, the IPv6 transition strategy is transmitted, and IPv6 transition strategy transmission equipment of the SFC controller effectively processes all IPv6 transition services which are required to be processed by the SFC controller in an existing network, so that the problems of incapability of a network system in effective running during fusion with an IPv6 transition technology and incapability in effective implementation of unified deployment of the IPv6 transition technology in the related technology are solved, and the effects of effectively reducing performance pressure on the existing network and greatly alleviating channel congestion between equipment and equipment are further achieved.

In the embodiment, multiple IPv6 transition technology types may be included. For example, the IPv6 transition technology may include at least one of: a DS-Lite technology, a 6RD technology, a 6PE technology, a 6VPE technology, a NAT technology, a NAT444 technology, a MAP technology, an IVI technology, a Light Weight 4over6 technology, a 6o4 tunneling technology, a 4o6 tunneling technology, a NAT64 technology, a P4ov6 tunneling technology and a stateful and stateless mixed translation 464XLAT technology. The SF set included in the SF node may also include multiple types of SFs, and for example, may include at least one of: SF-NAT, SF-SW, SF-LOG and SF-USER. It is important to note that the IPv6 transition technology types and the SF set included in the SF node described above are only examples.

Optionally, before the data message received at an SDN is processed according to the received IPv6 transition strategy, the received data message is classified by a service classifier, and then the classified data message is processed. That is, the service data message is classified to improve data message processing, equipment which receives the IPv6 transition strategy receives the data message classified by the service classifier, it is important to note that the data message carries information used for IPv6 transition, for example, the data message carries at least one of the following data message information: a service type, an IPv6 transition technology type, a next hop, a forwarding path, an outbound flag, an inbound flag, a flow sequence number, a public network address pool index, a user index and an access control list index, and IPv6 transition processing is performed according to the information of the data message. Optionally, the service classifier may be born in at least one of the following network equipment: a server, a virtual machine, a router, a switch, a home gateway and a firewall.

In addition, when the data message received at the SDN is processed according to the received IPv6 transition strategy, under a condition that the received data message is not the first message, processing is directly performed according to the information carried in the data message; and under a condition that the received data message is the first message, an IP address and a port are extracted from an address pool identified by the public network address pool index, a forwarding table entry is generated according to the extracted IP address and port and a source IP address, source port number and protocol type of the data message, and the data message is forwarded according to the generated forwarding table entry.

Another embodiment further provides a device for processing a data message, which is configured to implement the abovementioned embodiment and exemplary implementation mode, and that what has been described will not be elaborated. For example, term "component", used below, may implement a combination of software and/or hardware with a preset function. Although the device described in the following embodiment is preferably implemented with software, implementation with hardware or a combination of software and hardware is also possible and conceivable.

Figure 3:
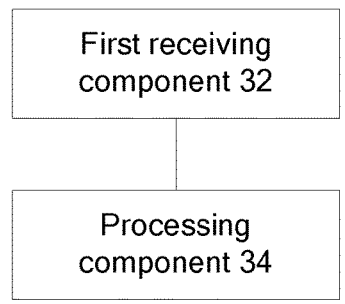
FIG. 3 is a structure block diagram of a device for processing a data message according to an embodiment of the present disclosure.

FIG. 3 is a structure block diagram of a device for processing a data message according to an embodiment of the present disclosure. As shown in FIG. 3, the device may include a first receiving component 32 and a processing component 34. The device will be described below.

The first receiving component 32 is configured to receive an IPv6 transition strategy used for executing an IPv6 transition technology from an SFC controller; and the processing component 34 is connected to the first receiving component 32, and is configured to process a received data message according to the received IPv6 transition strategy.

Figure 4:
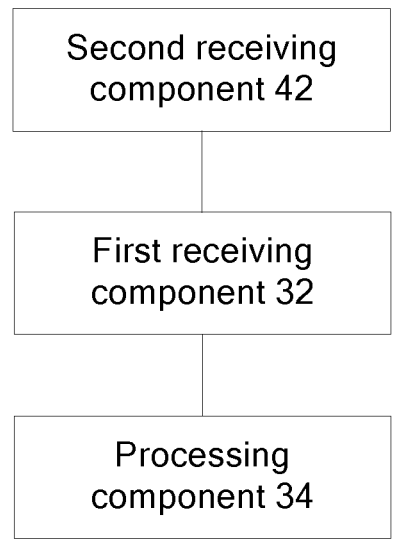
FIG. 4 is an exemplary structure block diagram of a device for processing a data message according to an embodiment of the present disclosure.

FIG. 4 is an exemplary structure block diagram of a device for processing a data message according to an embodiment of the present disclosure. As shown in FIG. 4, in addition to all the components shown in FIG. 3, the device may further include a second receiving component 42. The second receiving component 42 will be described below.

The second receiving component 42 is connected to the first receiving component 32, and is configured to receive the data message classified by a service classifier, wherein the data message carries at least one of the following data message information: a service type, an IPv6 transition technology type, a next hop, a forwarding path, an outbound flag, an inbound flag, a flow sequence number, a public network address pool index, a user index and an access control list index.

Figure 5:
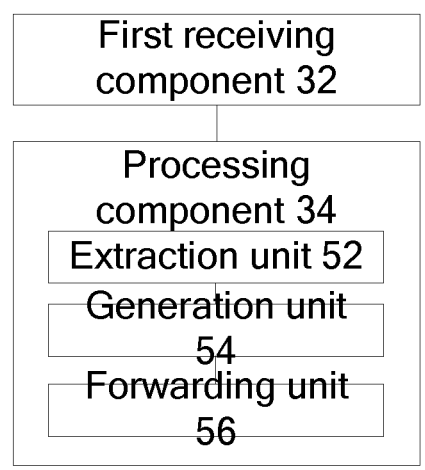
FIG. 5 is an exemplary structure block diagram of a processing component 34 in a device for processing a data message according to an embodiment of the present disclosure.

FIG. 5 is an exemplary structure block diagram of a processing component 34 in a device for processing a data message according to an embodiment of the present disclosure. As shown in FIG. 5, the processing component 34 may include an extraction unit 52, a generation unit 54 and a forwarding unit 56. The processing component 34 will be described below.

The extraction unit 52 is configured to, under a condition that the received data message is the first message, extract an IP address and a port from an address pool identified by the public network address pool index; the generation unit 54 is connected to the extraction unit 52, and is configured to generate a forwarding table entry according to the extracted IP address and port and a source IP address, source port number and protocol type of the data message; and the forwarding unit 56 is connected to the generation unit 54, and is configured to forward the data message according to the generated forwarding table entry.

Optionally, the device for processing a data message may be born in at least one of the following network equipment: a server, a virtual machine, a router, a switch, a home gateway and a firewall, i.e. IPv6 and IPv4 dual-stack and transition equipment, particularly for deployment of smooth IPv6 upgrading for the router, the switch, the firewall, the server and the home gateway. In addition, the network equipment may also be network equipment (such as a router, a firewall and virtual gateway equipment) with a NAT function.

The technical solution will be described below with reference to exemplary embodiments.

An SFC is a standard network technology. Since the development of a data center network to an overlay network, a network edge has become a demarcation point of a virtual network and a physical network, wherein the network edge is a server or The Onion Router (ToR), and may also be a gateway. However, the overlay technology cannot solve all problems, there is still so much middleware in a data center, such as a firewall/load balancer, processing of all the equipment is implemented on the basis of user services, and it is obviously inappropriate to traverse the equipment through tunneling. Such a deployment model of the data center requires that a virtual firewall/load balancer can be freely deployed in a network and is namely unrelated to a network topology. As a result, a new problem arises: how to flexibly process traffic through the virtual firewall/load balancer? Then, novel middleware such as the virtual firewall/load balancer is produced, and the virtual firewall/load balancer is deployed on an edge of the network and may be implemented by a standard server.

Figure 6:
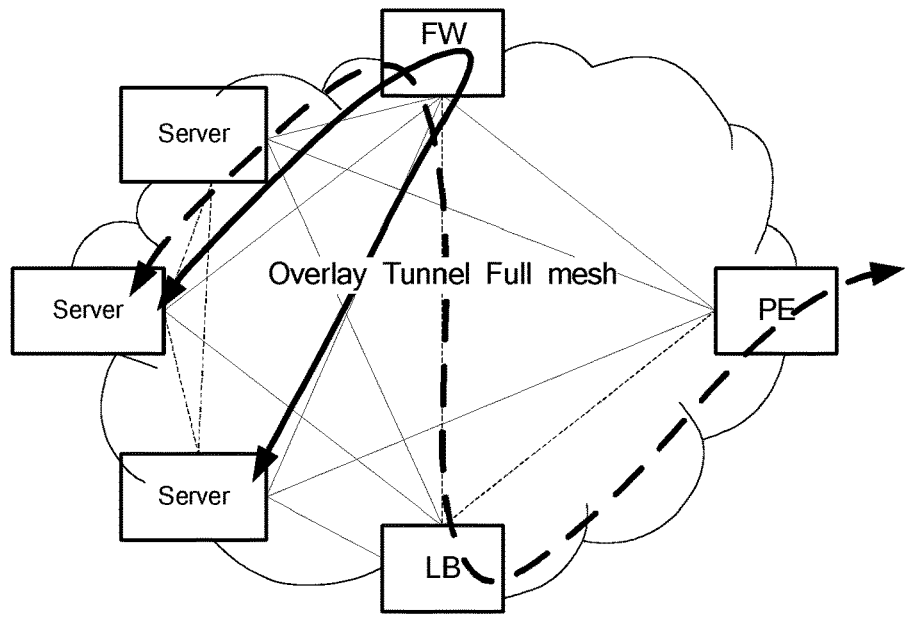
FIG. 6 is a diagram of an SFC according to an embodiment of the present disclosure.

In the related technology, a service processing function, such as a virtual firewall/load balancer/gateway, is called an SF, and traffic is processed by a series of SFs to form an SFC. FIG. 6 is a diagram of an SFC according to an embodiment of the present disclosure. As shown in FIG. 6, the full line and the dotted line respectively represent two SFCs. The framework the SFC may include the following components: service overlay, i.e. an overlay technology for communication of each network edge node; Generic Service Control Plane (GSCP), i.e. a controller forming an SFC; service classification, that is, it is necessary to perform flow identification and then perform specific SFC processing on a specific flow, and a node bearing a service classification component is usually called classifier; dataplane metadata, which is a major characteristic, the metadata allowing each edge service processing node to exchange information with one another to achieve a certain service processing purpose; and a service node or SF node, which is an SF running and generation carrier and may be a device such as a server, a virtual machine and network equipment. An SFC may separate an SF and forwarding of network equipment, thereby implementing independent operation and processing of the SF and improving forwarding performance of the network equipment.

In view of the abovementioned characteristics of an SFC, the embodiment provides a method for deploying an IPv6 transition technology in a unified manner on the basis of an SFC, in which the SFC is fused into a current SDN structure, to solve problems of SDN and IPv6 transition technology fusion, and may effectively cooperate with the SDN structure, and a message format and transmitted data of metadata, i.e. contents of the metadata of information exchanged by each service edge processing node, are defined to implement unified deployment of the IPv6 transition technology.

The method for deploying the IPv6 transition technology in the unified manner on the basis of the SFC will be described below.

SFC-based unified deployment of the IPv6 transition technology is summarized to realize the following four SFs:

a NAT function: NAT in the embodiments of the present disclosure refers to a general term of address translation technologies, including all technologies relating to address translation such as Network Address Port Translation (NAPT) and NAT64, and such an SF is called SF-NAT hereinafter;

an SW function: an SW is a tunneling technology, and such an SF is called SF-SW hereinafter;

a log function: a NAT log of a user is recorded, and such an SF is called SF-LOG hereinafter; and a user management function: a function of a user management component is executed, and such an SF is called SF-USER hereinafter.

The IPv6 transition technology may include one or more of the abovementioned SFs. Each SF runs on an SF node. The SF node may be at least one of network equipment, a physical server or a virtual server, for example, the SF node may be a router, a switch, a home gateway, a firewall, a blade server and a virtual machine.

Forwarding equipment and an SFC controller do not directly perform message interaction about the IPv6 transition technology, and the SFC controller also does not process services of NAT, SW, sessions, user management and the like. The four SFs, i.e. SF-NAT, SF-SW, SF-LOG and SF-USER, are processed on the SF node, and the SF node transmits related metadata information with a service classification component. The service classification component is configured to perform flow identification and then perform specific SFC processing according to a specific flow. The component may run on various network equipment or servers, including Customer Premises Equipment (CPE), a set-top box, a router, a switch, a firewall, a server, a virtual machine and the like.

The SFC controller is equipment for management, calculation and control of the SF node, and may be fused with or independent of an SDN controller. In addition, the SF node is configured to perform operation of section creation, deletion, updating and the like. In the embodiments, the SF node and the SFC controller also perform information message interaction about address pool interaction information and service configuration information. The forwarding equipment and the SF controller also perform message interaction and service processing in addition to the IPv6 transition technology, which will not be elaborated.

(1) The SFC controller transmits an IPv6 transition strategy to the SF node.

The SFC controller transmits the IPv6 transition strategy to the SF node according to configuration information.

The IPv6 transition strategy may include a transition technology type, public network address pool information and an SF set required by the SF node.

The transition technology type may include at least one of technology types such as DS-Lite, 6RD, 6PE, 6VPE, NAT, NAT444, MAP, IVI, Light Weight 4over6, 6o4, 4o6 tunneling, NAT64, a P4ov6 tunneling technology and a stateful and stateless mixed translation 464XLAT technology.

The public network address pool information refers to a public network IP address pool used for NAT (including NAT44, NAT64 and NAT46).

The SF set required by the SF node may include at least one of SF-NAT, SF-SW, SF-LOG and SF-USER.

(2) After the SFC controller transmits the IPv6 transition strategy to the SF node, the service classification component and the SF node implement operation and message interaction as follows.

The service classification component of the classifier sends the first message of a user side and metadata to the SF.

The first message of the user side refers to that the message is a message initiated to access an extranet by user-side equipment by virtue of a certain IP address, a certain port and a certain protocol number as a source IP address, a source port number and a protocol number for the first time.

The extranet refers to all networks, except the network connected with the user side, in networks connected with the forwarding equipment.

Field information of the message of the user side may include at least one of the source IP address, a destination IP address, the source port, a destination port and the protocol number.

Figure 7:
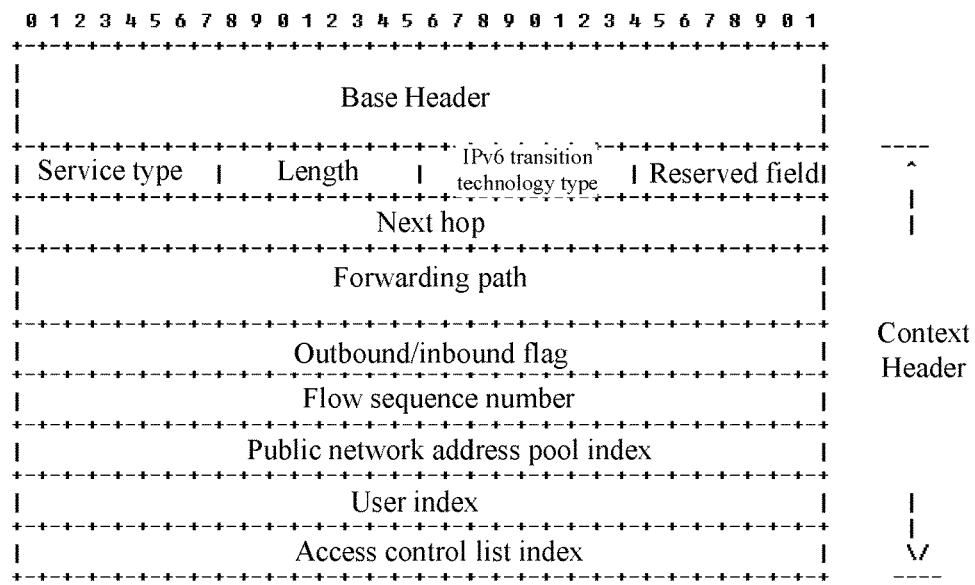
FIG. 7 is a diagram of metadata interacted between a service classification component and an SFC node through a message according to an embodiment of the present disclosure.

The service classification component is also required to, besides sending the whole first message to the SF node, encapsulate at least one of a service type, an IPv6 transition technology type, a next hop, a forwarding path, an outbound/inbound flag, a flow sequence number, a public network address pool index, a user index and an access control list index in the metadata. FIG. 7 is a diagram of metadata interacted between a service classification component and an SFC node through a message according to an embodiment of the present disclosure. As shown in FIG. 7, the metadata and the first message are sent to the SF node together.

In the related technology, a message format of the metadata consists of a base header (header of a basic network service message) and a context header (information header). In the embodiment, a context header (information header) of the IPv6 transition technology is defined. As shown in FIG. 3, the context header defined in the embodiment includes: the service type, the IPv6 transition technology type, a length, a reserved field, the next hop, the forwarding path, the outbound/inbound flag, the flow sequence number, the public network address pool index, the user index and the access control list index form the context header of the IPv6 transition technology together.

It is important to note that the outbound/inbound flag is a value for indicating whether the message is sent from the user side to the extranet or sent from the extranet to the user side. The service type is used for identifying a type of the context header to be a service for deployment of an IPv6 transition network. The length refers to a byte length of the context header. The IPv6 transition technology type identifies the IPv6 transition technology for the network. The next hop identifies the next destination to which the message is forwarded. The forwarding path identifies forwarding equipment through which the message is required to pass when being forwarded. The flow sequence number identifies a flow to which the message belongs. The public network address pool index identifies an address pool required by NAT of the message. The user index identifies a user by whom the message is sent. The access control list index identifies an access control list rule applicable to the message.

If the message received from the user side by the service classification component is not the first message, the message is forwarded according to a found table entry.

The SF node generates the forwarding table entry according to the received first message of the user side, and forwards the message.

By the abovementioned embodiment and exemplary implementation mode, not only are problems of IPv6 transition technology deployment in the related technology solved, but also many shortcomings in the related technology are overcome.

The metadata, i.e. the information exchanged by each edge service processing node, is defined to make it possible to implement IPv6 transition technology fusion under an SFC structure. By adopting a hierarchical structure, SF nodes are located between forwarding equipment and SFC controllers, and are quantitatively more than the SFC controllers, so that the number of sessions stored by each SF node is far smaller than the number of sessions required to be stored by the SDN controller in the related art, and pressure on memory performance of the server is reduced. Data packets sent by the forwarding equipment are converged in one SDN controller, and instead, are separately sent to each SF node, so that the problem of channel congestion between the forwarding equipment and the server is effectively solved by adding the SF nodes under the condition of not changing the SDN structure.

Due to the large number of CPE, requirements of the CPE increase in IPv6 transition technologies. For example, the CPE is required to implement services of NAT, SW, Port Control Protocol (PCP) clients and the like, so that cost of the CPE increasingly occupies an important part of cost of an operating company. By unifying and simplifying the requirements of the CPE, the CPE is only required to realize a channel function for the SF nodes, and all of the other services may be implemented on the SF nodes, so that operating cost is effectively reduced.

Exemplary embodiments of the present disclosure will be described below with reference to the drawings.

EXEMPLARY EMBODIMENT 1

Figure 8:
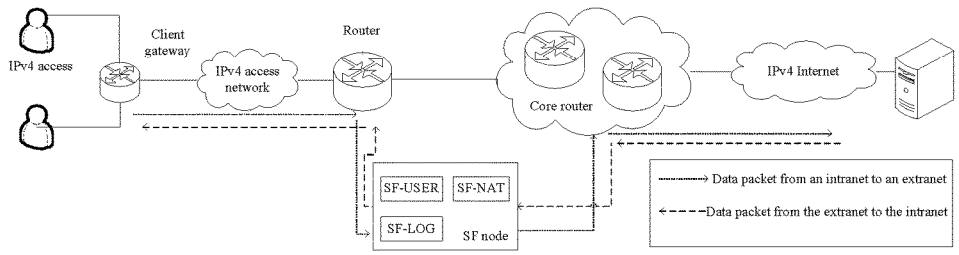
FIG. 8 is a diagram of an SFC-based NAT44 deployment scenario according to exemplary embodiment 1 of the present disclosure.

FIG. 8 is a diagram of an SFC-based NAT44 deployment scenario according to exemplary embodiment 1 of the present disclosure. As shown in FIG. 8, the flow of an SFC-based IPv6 transition technology deployment method may include the following steps.

Step S1: an SDN controller transmits a public network address pool used for NAT to a classifier, wherein the classifier in the embodiment resides on a router.

Step S2: the SDN controller transmits a location of a network NAT44 scenario to an SFC (i.e. a location of network equipment controlled by the SDN controller, such as the router) through a corresponding configuration, and transmits an SF node to form an SFC, SFs in the SFC including SF-NAT, SF-LOG and SF-USER.

An outbound traffic processing flow (data traffic sent from a user-side network to an extranet):

Step S3: an IPv4 user-side terminal sends an Internet access message, which arrives at the router after passing through a client gateway and related network equipment;

Step S4: the router receives the message, and searches a forwarding table; the router cannot find any corresponding forwarding table entry because the message is the first message, then the router sends the message to a service classification component, and the service classification component encapsulates the message and marks such as a forwarding path, a next hop, an outbound/inbound flag and a public network address pool index into metadata, and sends the metadata to the SF node;

Step S5: the SF node discovers that the message is an outbound message (i.e. a message sent from a use side to the extranet), then performs SF-USER processing, and searches for user information to confirm that the user is a legal user;

Step S6: the SF node continues performing SF-NAT on the message, the SF node searches for the forwarding table according to a source IP address, source port number and protocol type of the message, and if a searching result indicates that there is no related forwarding table entry (i.e. the first message), selects an IP address from an address pool identified by the public network address pool index and a port as an IP address and port obtained by NAT to be combined with the source IP address, the source port number and the protocol type to generate a forwarding table entry;

Step S7: the SF node performs network address and port translation on the message, and sends the message to the next hop through the next hop and forwarding path carried in the metadata;

Step S8: the SF node performs SF-LOG processing, and records generation time of the forwarding table entry; and Step S9: the SF node configures a forwarding table strategy to be forwarding through forwarding equipment, and then transmits the generated forwarding table entry to the forwarding equipment. The flow of transmission of the first message and generation of the forwarding table is completed.

An inbound traffic processing flow (data traffic sent from the extranet to the user-side network):

Step S10: after an Internet-side message is sent to the router, the router searches for a corresponding forwarding table;

Step S11: if a related forwarding table entry is found, network address and port translation is performed on the message, and the message is sent to the next hop until the user side; and Step S12: if there is no related forwarding table entry found, the message is discarded.

EXEMPLARY EMBODIMENT 2

Figure 9:
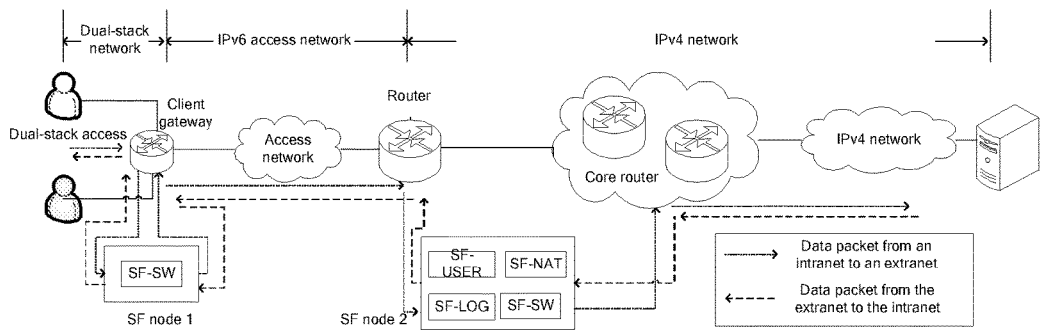
FIG. 9 is a diagram of an SFC-based DS-Lite deployment scenario according to exemplary embodiment 2 of the present disclosure.

FIG. 9 is a diagram of an SFC-based DS-Lite deployment scenario according to exemplary embodiment 2 of the present disclosure. As shown in FIG. 9, on the basis of the structure shown in FIG. 9, a flow of an SFC-based IPv6 transition technology deployment method may include the following steps.

Step S1: an SDN controller transmits a public network address pool used for NAT to a classifier of a router, wherein two classifiers in the embodiment reside on a client gateway and the router respectively.

Step S2: the SDN controller transmits a location of a network DS-Lite scenario to an SFC (i.e. a location of network equipment controlled by it, such as the router and the client gateway) through a corresponding configuration, and transmits SF nodes to form an SFC, SFs in the SFC including SF-NAT, SF-LOG SF-USER and SF-SW.

In the embodiment, SF node 1 controlling the client gateway transmits SF-SW, and SF node 2 controlling forwarding equipment transmits SF-NAT, SF-LOG SF-USER and SF-SW.

An outbound traffic processing flow (data traffic sent from a user-side network to an extranet):

Step S3: a dual-stack user-side terminal sends an IPv4 message of accessing an IPv4 Internet, the client gateway sends the IPv4 message to the classifier when the IPv4 message passes through the client gateway, and the classifier sends the message and metadata containing an outbound flag and a forwarding path to SF node1;

Step S4: SF node 1 discovers that the IPv4 message is an outbound message, performs SF-SW processing, namely encapsulates the message in an IPv6 tunnel, and sends the message to next-level forwarding equipment according to the forwarding path carried in the metadata;

Step S5: the router sends the message to the classifier after receiving the message encapsulated in the IPv6 tunnel, and the classifier encapsulates the message, the forwarding path, a next hop and the outbound/inbound flag into the metadata, and sends the metadata to SF node 2;

Step S6: SF node 2 discovers that the message is an outbound message (i.e. a message sent from a user side to the extranet), and then performs SF-USER processing and searches for user information to confirm that the user is a legal user;

Step S7: SF node 2 performs SF-SW processing on the message, and decapsulates an IPv6 tunnel header of the message to recover the IPv4 message;

Step S8: SF node 2 performs SF-NAT processing on the IPv4 message, the SF node searches for a forwarding table according to a source IP address, source port and protocol type of the message, and if a searching result indicates that there is no related forwarding table entry (i.e. the first message), selects an IP address from the public network address pool and a port as an IP address and port obtained by NAT to be combined with the source IP address, the source port number and the protocol type to generate a forwarding table entry;

Step S9: SF node 2 performs network address and port translation on the message, and sends the message to next forwarding equipment through the next hop and forwarding path carried in the metadata;

Step S10: SF node 2 performs SF-LOG processing, and records generation time of the forwarding table entry; and Step S11: SF node 2 configures a forwarding table strategy to be local forwarding, and does not transmit the forwarding table to the router to finish execution of the first message and forwarding table generation flow.

An inbound traffic processing flow (data traffic sent from the extranet to the user-side network):

Step S12: after an Internet-side message is sent to the router, the router sends the message to the classifier, and the classifier sends the message and metadata containing an inbound flag to SF node 2 for SF node 2 to search for a forwarding table;

Step S13: if finding a related forwarding table entry, SF node 2 performs network address and port translation on the message, performs IPv6 tunnel encapsulation and sends the message to next network equipment until the client gateway;

Step S14: if not finding a related forwarding table entry, SF node 2 discards the message (or performs other processing according to a specific configuration, which is the related art);

Step S15: the client gateway sends the message to SF node 1 after receiving the IPv6 tunnel message; and Step S16: SF node 1 decapsulates the message to recover an IPv4 message, and sends the message to the next processing unit until the dual-stack user-side terminal.

EXEMPLARY EMBODIMENT 3

Figure 10:
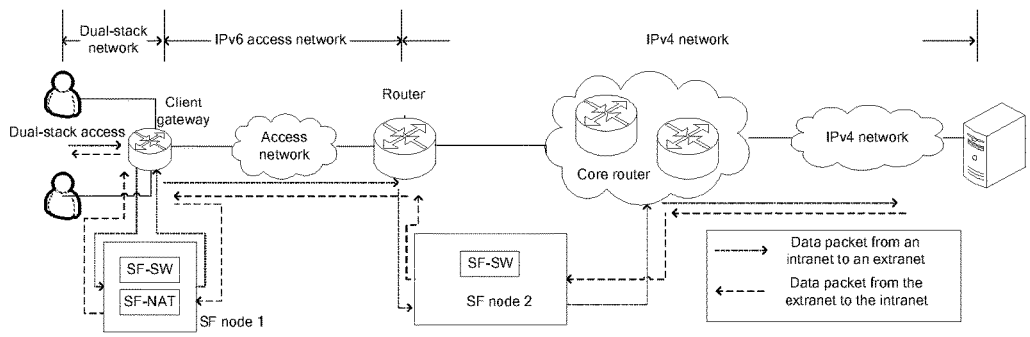
FIG. 10 is a diagram of an SFC-based Light Weight 4over6 deployment scenario according to exemplary embodiment 3 of the present disclosure.

FIG. 10 is a diagram of an SFC-based Light Weight 4over6 deployment scenario according to exemplary embodiment 3 of the present disclosure. As shown in FIG. 10, a flow of an SFC-based IPv6 transition technology deployment method may include the following steps.

Step S1: an SDN controller transmits a public network address pool used for NAT to a classifier of a client gateway, wherein two classifiers in the embodiment reside on the client gateway and a router respectively.

Step S2: the SDN controller transmits a location of a network Light Weight 4over6 scenario to an SFC (i.e. a location of network equipment controlled by it, such as the router and the client gateway) through a corresponding configuration, and transmits SF nodes to form an SFC, SFs in the SFC including SF-NAT, SF-LOG SF-USER and SF-SW.

In the embodiment, SF node 1 controlling the client gateway transmits SF-SW and SF-NAT, and SF node 2 controlling forwarding equipment transmits SF-SW.

An outbound traffic processing flow (data traffic sent from a user-side network to an extranet):

Step S3: a dual-stack user-side terminal sends an IPv4 message of accessing an IPv4 Internet, the client gateway sends the IPv4 message to the classifier when the IPv4 message passes through the client gateway, and the classifier sends the message and metadata containing an outbound flag, a forwarding path and a public network address pool index to SF node1;

Step S4: SF node 1 discovers that the IPv4 message is an outbound message, and performs SF-SW processing, and the SF node searches for a forwarding table according to a source IP address, source port and protocol type of the message, and if a searching result indicates that there is no related forwarding table entry (i.e. the first message), selects an IP address from the public network address pool and a port as an IP address and port obtained by NAT to be combined with the source IP address, the source port number and the protocol type to generate a forwarding table entry;

Step S5: SF node 1 performs SF-SW processing on the message, encapsulates the message in an IPv6 tunnel, and sends the message to next-level forwarding equipment according to the forwarding path carried in the metadata;

Step S6: the router sends the message to the classifier after receiving the message encapsulated in the IPv6 tunnel, and the classifier encapsulates the message, the forwarding path, a next hop and the outbound flag into the metadata, and sends the metadata to SF node 2;

Step S7: SF node 2 performs SF-SW processing on the message, and decapsulates an IPv6 tunnel header of the message to recover the IPv4 message; and Step S8: SF node 2 sends the message to next forwarding equipment through the next hop and forwarding path carried in the metadata.

An inbound traffic processing flow (data traffic sent from the extranet to the user-side network):

Step S9: after an Internet-side message is sent to the router, the router sends the message to the classifier, the classifier sends the message and metadata to SF node 2, and SF node 2 performs IPv6 decapsulation operation, and sends the message to next-level forwarding equipment until the client gateway;

Step S10: the client gateway sends the message to SF node 1 after receiving the IPv6 tunnel message;

Step S11: SF node 1 performs IPv6 tunnel decapsulation to recover the message into an IPv4 message, and searches for a related forwarding table;

Step S12: if finding a related forwarding table entry, SF node 1 performs network address and port translation on the message, and sends the message to the dual-stack user-side terminal; and Step S13: if not finding a related forwarding table entry, SF node 1 discards the message Obviously, those skilled in the art should know that each component of each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, the shown or described steps may be executed in sequences different from those described here in some circumstances, or may form each integrated circuit component respectively, or multiple components or steps therein may form a single integrated circuit component for implementation. As a consequence, the present disclosure is not limited to any specific hardware and software combination.

The above is only the exemplary embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

INDUSTRIAL APPLICABILITY

As mentioned above, according to the abovementioned embodiments and exemplary implementation modes, not only may performance pressure on an existing network be effectively reduced, but also channel congestion between equipment and equipment is greatly alleviated.

What is claimed is:

1. A method for processing a data message, comprising:
receiving an Internet Protocol version 6 (IPv6) transition strategy used for executing an IPv6 transition technology from a Service function chain (SFC) controller, wherein the IPv6 transition strategy comprises a Service Function (SF) set comprised in an SF node; and
processing a received data message according to the received IPv6 transition strategy;
wherein processing the data message received at the SDN according to the received IPv6 transition strategy comprises: under a condition that the received data message is the first message, extracting an Internet Protocol (IP) address and a port from an address pool identified by the public network address pool index; generating a forwarding table entry according to the extracted IP address and port and a source IP address, source port number and protocol type of the data message; and forwarding the data message according to the generated forwarding table entry.

2. The method as claimed in claim 1, wherein the IPv6 transition strategy further comprises at least one of:
an IPv6 transition technology type used for identifying a technology type for IPv6 transition, and public network address pool information used for identifying Network Address Translation (NAT) of the data message.

3. The method as claimed in claim 2, wherein the IPv6 transition technology type comprises at least one of:
a Dual-Stack Lite (DS-Lite) technology, an IPv6 Rapid Deployment (6RD) technology, an IPv6 Provider Edge (6PE) technology, an IPv6 Virtual Private Network Provider Edge (6VPE) technology, a NAT technology, a NAT IPv4-IPv4-IPv4 (NAT444) technology, a Mapping of Address and Port with Encapsulation (MAP) technology, a IV-VI (IVI) technology, a Light Weight 4over6 technology, an IPv6 over IPv4 (6o4) tunneling technology, an IPv4 over IPv6 (4o6) tunneling technology, a NAT IPv6-IPv4 (NAT64) technology, a Popular IPv4 over IPv6 (P4ov6) tunneling technology and a stateful and stateless mixed translation 464XLAT technology.

4. The method as claimed in claim 1, wherein the SF set comprised in the SF node comprises at least one of:
SF-NAT, SF-Soft Wire (SF-SW), SF-LOG and SF-USER.

5. The method as claimed in claim 1, before processing the data message received at a Software Defined Network (SDN) according to the received IPv6 transition strategy, further comprising:

receiving the data message classified by a service classifier, wherein the data message carries at least one of the following data message information: a service type, an IPv6 transition technology type, a next hop, a forwarding path, an outbound flag, an inbound flag, a flow sequence number, a public network address pool index, a user index and an access control list index.

6. The method as claimed in claim 5, wherein the service classifier is born in at least one of the following network equipment:
a server, a virtual machine, a router, a switch, a home gateway and a firewall.

7. A device for processing a data message, comprising:
a first receiving component, configured to receive an Internet Protocol over 6 (IPv6) transition strategy used for executing an IPv6 transition technology from a Service Function Chain (SFC) controller, wherein the IPv6 transition strategy comprises a Service Function (SF) set comprised in an SF node; and
a processing component, configured to process a received data message according to the received IPv6 transition strategy;
wherein the processing component comprises: an extraction unit, configured to, under a condition that the received data message is the first message, extract an Internet Protocol (IP) address and a port from an address pool identified by the public network address pool index; a generation unit, configured to generate a forwarding table entry according to the extracted IP address and port and a source IP address, source port number and protocol type of the data message; and a forwarding unit, configured to forward the data message according to the generated forwarding table entry.

8. The device as claimed in claim 7, further comprising:
a second receiving component, configured to receive the data message classified by a service classifier, wherein the data message carries at least one of the following data message information: a service type, an IPv6 transition technology type, a next hop, a forwarding path, an outbound flag, an inbound flag, a flow sequence number, a public network address pool index, a user index and an access control list index.

9. The device as claimed in claim 7, born in at least one of the following network equipment:
a server, a virtual machine, a router, a switch, a home gateway and a firewall.

10. The device as claimed in claim 8, born in at least one of the following network equipment:
a server, a virtual machine, a router, a switch, a home gateway and a firewall.

* * * * *